(12) United States Patent
Tanaka

(10) Patent No.: US 11,030,770 B2
(45) Date of Patent: Jun. 8, 2021

(54) MARKER AND POSTURE ESTIMATING METHOD USING MARKER

(71) Applicant: National Institute of Advanced Industrial Science and Technology, Tokyo (JP)

(72) Inventor: Hideyuki Tanaka, Nagareyama (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 223 days.

(21) Appl. No.: 16/332,733

(22) PCT Filed: Sep. 5, 2017

(86) PCT No.: PCT/JP2017/031925
§ 371 (c)(1),
(2) Date: Mar. 12, 2019

(87) PCT Pub. No.: WO2018/051843
PCT Pub. Date: Mar. 22, 2018

(65) Prior Publication Data
US 2019/0228541 A1 Jul. 25, 2019

(30) Foreign Application Priority Data
Sep. 13, 2016 (JP) .............................. JP2016-178590

(51) Int. Cl.
*G06T 7/73* (2017.01)
*G01B 11/26* (2006.01)
(Continued)

(52) U.S. Cl.
CPC .............. *G06T 7/73* (2017.01); *G01B 11/002* (2013.01); *G01B 11/26* (2013.01); *G06T 1/00* (2013.01);
(Continued)

(58) Field of Classification Search
None
See application file for complete search history.

(56) References Cited

U.S. PATENT DOCUMENTS

2003/0063292 A1   4/2003 Mostafavi
2007/0081695 A1*  4/2007 Foxlin .................. G06T 7/73
                                                382/103
(Continued)

FOREIGN PATENT DOCUMENTS

CN        102980528 A       3/2013
CN        103134425 A       6/2013
(Continued)

OTHER PUBLICATIONS

International Preliminary Report on Patentability dated Mar. 19, 2019, issued in PCT Application No. PCT/JP2017/031925, filed Sep. 5, 2017.
(Continued)

*Primary Examiner* — David Perlman
(74) *Attorney, Agent, or Firm* — Workman Nydegger

(57) ABSTRACT

The present invention provides a marker that can uniquely estimate the posture within wide-angle range while maintaining the flatness, and a posture estimating method. The marker includes a two-dimensional pattern code and a posture detection pattern emitting different light depending on an observation direction of the pattern code at around the first axis on a two-dimensional plane formed by the pattern code. The method using the marker has a Step-1 of using a captured image of the marker to identify a color of the light or a pattern drawn by the light, Step-2 of determining, depending on the color or the pattern identified in Step-1, a posture of the marker at around the first axis, and a Step-3 of determining a posture of the marker depending on a positional relation between the posture at around the first
(Continued)

axis determined in Step-2 and the elements constituting the captured image.

16 Claims, 10 Drawing Sheets

(51) Int. Cl.
*G06T 1/00* (2006.01)
*G01B 11/00* (2006.01)
*G06T 7/90* (2017.01)

(52) U.S. Cl.
CPC ...... *G06T 7/90* (2017.01); *G06T 2207/10024* (2013.01); *G06T 2207/30204* (2013.01)

(56) References Cited

U.S. PATENT DOCUMENTS

2014/0111639 A1    4/2014  Tanaka et al.
2016/0239952 A1*   8/2016  Tanaka .................. G06T 7/70

FOREIGN PATENT DOCUMENTS

CN    104567727 A     4/2015
CN    105509654 A     4/2016
CN    105612401 A     5/2016
JP    2007-34866 A    2/2007
JP    2012-145559 A   8/2012
WO    2016/024555 A1  2/2016

OTHER PUBLICATIONS

Hideyuki Tanaka et al., *A High-Accuracy Visual Marker Based on a Microlens Array*, Proceedings of 2012 IEEE/RSJ International Conference of Intelligent Robots and Systems, Oct. 7-12, 2012, pp. 4192-4197.

Chinese Office Action dated Jul. 10, 2020, issued in Chinese Application No. 201780056444.9.

Hideyuki Tanaka et al., *A Motion Tracker Using High-Accuracy AR Markers for On-Site Motion Analysis*, 2015 IEEE International Conference on Systems, Man, and Cybernetics, 2015, pp. 1427-1432.

Hideyuki Tanaka et al., *A Solution to Pose Ambiguity of Visual Markers Using Moiré Patterns*, 2014 IEEE/RSJ International Conference on Intelligent Robots and Systems (IROS 2014), Sep. 2014, pp. 3129-3134.

* cited by examiner

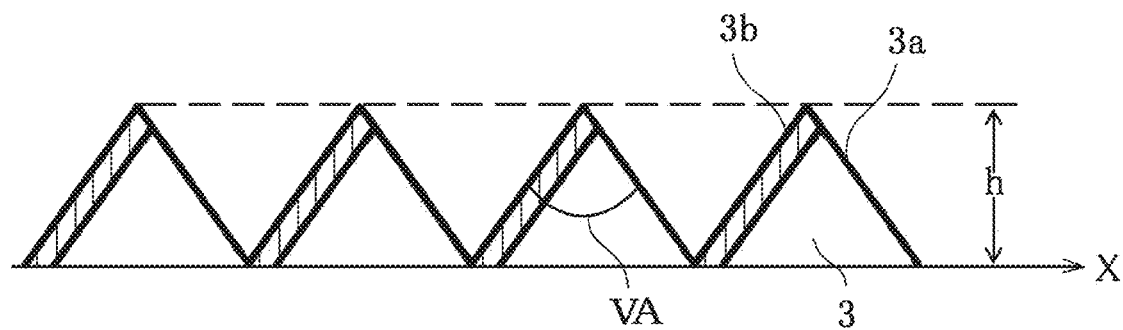
FIG.6
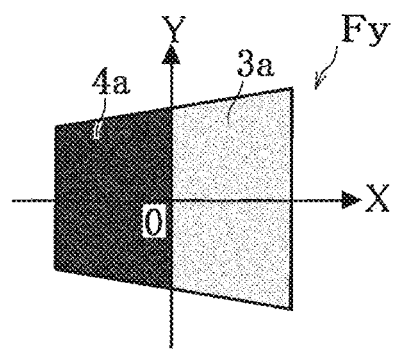 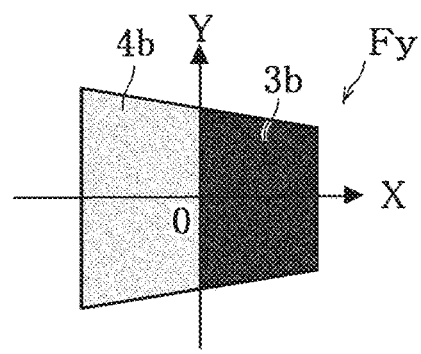
FIG.7A  FIG.7B

MARKER AND POSTURE ESTIMATING METHOD USING MARKER

TECHNICAL FIELD

The present invention relates to a marker to estimate a posture and a posture estimating method using this marker.

BACKGROUND ART

A planar pattern has been suggested that uses an imaging operation by a monocular camera to provide the measurement of the position or posture in a three-dimensional space. Such a planar pattern is generally called a planar visual marker.

Such a planar visual marker is used in the field of Augmented Reality (AR) or robotics by being adhered to an object. The posture is estimated based on the distortion of the appearance of the outline shape of a planar visual marker in accordance with the projective transformation principle.

However, some conditions cause the projection onto an image of a planar visual marker M to be closer to the orthogonal projection shown in FIG. 13B than the perspective projection shown in FIG. 13A, which causes a disadvantage of an unclear posture that whether or not the planar visual marker having any posture of the planar visual markers M1 and M2 shown in FIG. 14 to the camera cannot be uniquely estimated.

Thus, a planar visual marker provided with four moire (interference fringe) patterns has been conventionally suggested by the inventor of this application (see Patent Publication 1).

CITATION LIST

Patent Literature

PTL 1: International Publication No. WO/2016/024555

SUMMARY OF INVENTION

Technical Problem

However, there is a disadvantage that, when a planar visual marker is seen from a shallow angle (i.e., when a visual-line angle (which will be described later) is large), a pattern having the same appearance is caused or the pattern cannot be discriminated regardless of the visual-line angle at around a certain coordinate axis is positive or negative, thus preventing the posture of the object from being uniquely estimated.

The present invention has been made in order to solve the problem as described above. It is an objective of the invention to provide a marker by which a posture can be uniquely estimated in a wide angle range while maintaining the flatness and a posture estimating method using this marker.

Solution to Problem

In order to solve the above disadvantages, the present invention provides a marker that includes a two-dimensional pattern code and the first posture detection pattern emitting different light depending on an observation direction of the two-dimensional pattern code at around the first axis on a two-dimensional plane formed by the two-dimensional pattern code.

Additionally, in order to solve the above disadvantages, the present invention provides a posture estimating method using a marker including a two-dimensional pattern code and the first posture detection pattern emitting different light depending on an observation direction of the two-dimensional pattern code at around the first axis on a two-dimensional plane formed by the two-dimensional pattern code. The method includes the first step of identifying the color of the light or a pattern drawn by the light using a captured image of the marker, the second step of determining, depending on the color or pattern identified by the first step, the posture of the marker at around the first axis, and the third step of determining the posture of the marker depending on a positional relation between the posture at around the first axis determined by the second step and elements constituting the captured image.

Advantageous Effects of Invention

The present invention can provide a marker that can uniquely estimate a posture in a wide angle range while maintaining the flatness and a posture estimating method using this marker.

BRIEF DESCRIPTION OF DRAWINGS

FIG. 5(a) is a cross-sectional view illustrating a cross-sectional structure obtained when the posture detection pattern Fy shown in FIG. 4 is cut along the X axis of FIG. 5(a). FIG. 5(b) illustrates the letter "A" drawn on a series of side faces 3a in the posture detection pattern Fy. FIG. 5(c) illustrates the letter "B" drawn on a series of side faces 3b in the posture detection pattern Fy;

FIG. 6 is a cross-sectional view illustrating the cross-sectional structure obtained when a plurality of parallelly-provided triangle poles 3 shown in FIG. 4 are cut along the X axis;

FIG. 7A is a schematic view illustrating the function of the posture detection pattern Fy shown in FIG. 3 and FIG. 4 and showing how the posture detection pattern Fy is seen at a visual-line angle having a positive direction;

FIG. 7B is a schematic view illustrating the function of the posture detection pattern Fy shown in FIG. 3 and FIG. 4 and showing how the posture detection pattern Fy is seen at a visual-line angle having a negative direction;

DESCRIPTION OF EMBODIMENTS

Figure 1:
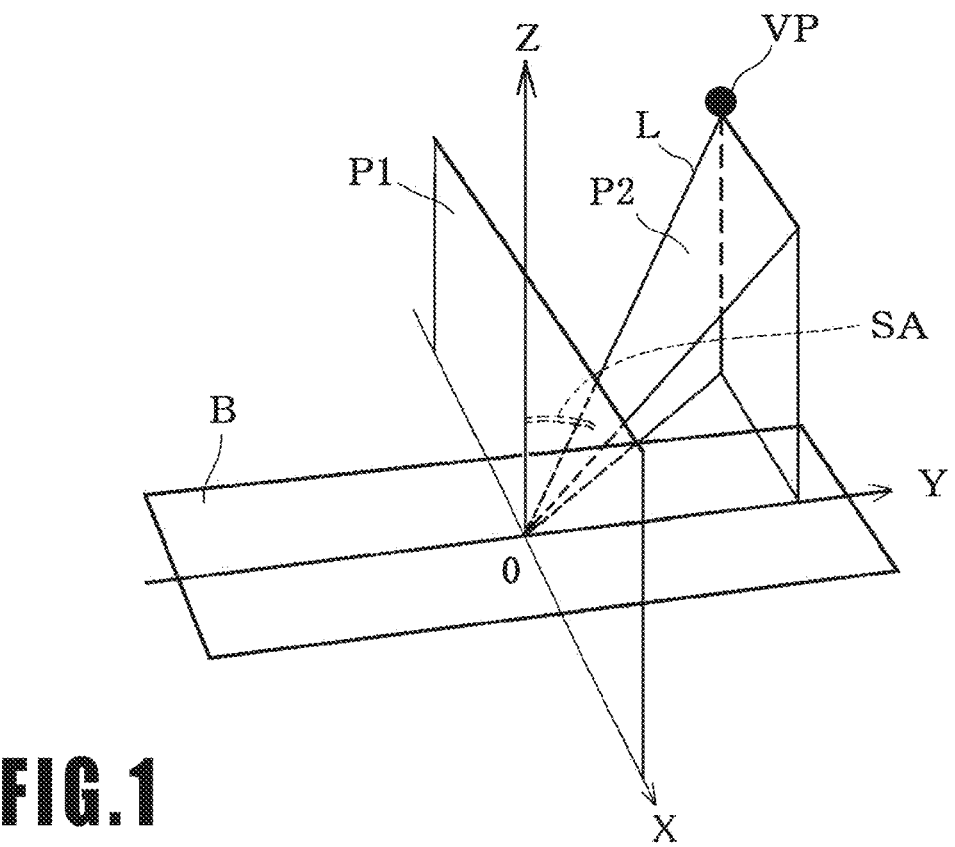
FIG. 1 illustrates the definitions of a visual line and a visual-line angle.

The following section will describe an embodiment of the present invention with reference to the drawings in which the same reference numerals denote the same or similar parts.

First, with reference to FIG. 1 and FIG. 2, the definitions of terms will be described. The following section will exemplarily describe the phenomena at around the X axis. However, the phenomena at around the arbitrary axis will be also defined.

The line L shown in FIG. 1 obtained by connecting an observation visual point VP to an origin 0 at the center of the target object B is called a visual line. As shown in FIG. 1, when assuming that a plane including the Z axis forming the perpendicular line on the XY plane in the target object B and the X axis orthogonal to the Z axis is a plane P1 and a plane including the line L showing the visual line and the X axis is a plane P2, an angle SA formed by the plane P1 and the plane P2 is called a visual-line angle at around the X axis.

Figure 2:
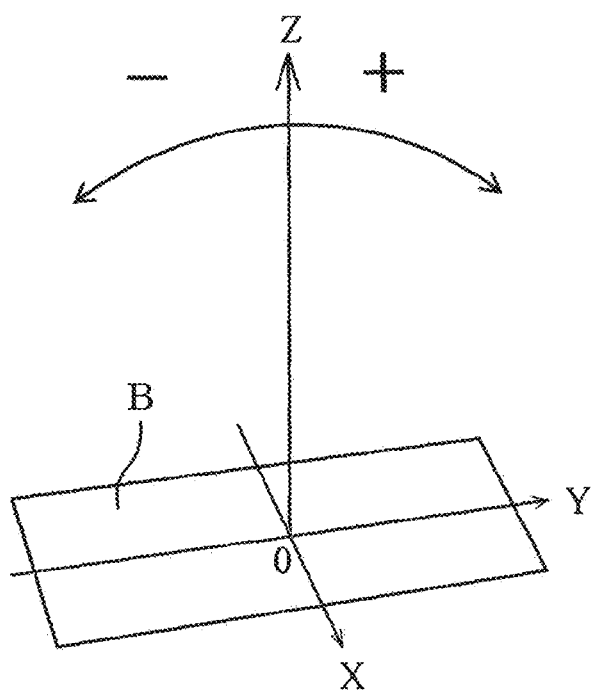
FIG. 2 illustrates the definition of posture inversion.

Thus, as shown in FIG. 2, when the coordinate Y of the observation visual point VP is positive, the sign of the visual-line angle at around the X axis is positive (+). When the coordinate Y of the observation visual point VP is negative, the sign of the visual-line angle at around the X axis is negative (−). When the signs of visual-line angles are inverted, it is called a posture inversion at around the X axis.

Embodiment 1

Figure 3:
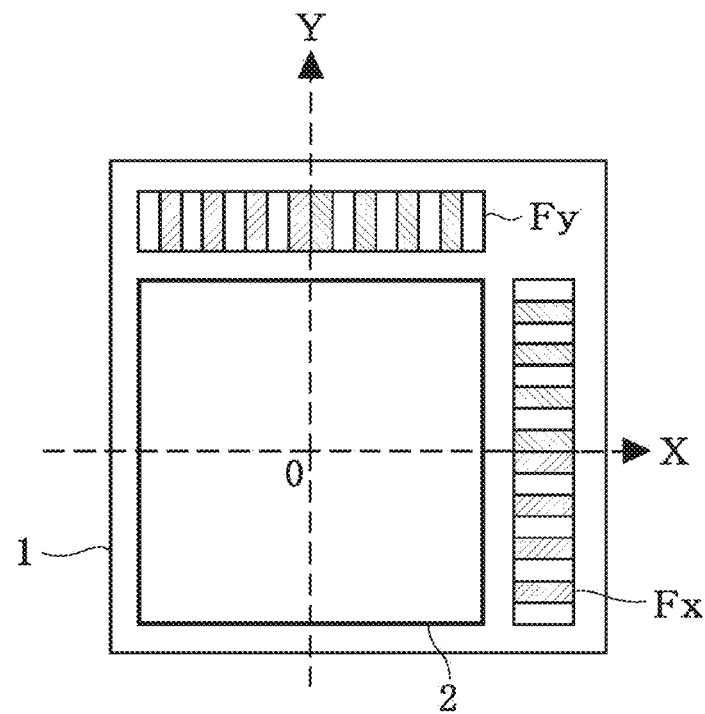
FIG. 3 is a plan view illustrating the configuration of a planar visual marker 1 according to Embodiment 1 of the present invention.

FIG. 3 is a plan view illustrating the configuration of the planar visual marker 1 according to Embodiment 1 of the present invention. As shown in FIG. 3, the planar visual marker 1 includes a rectangular AR marker 2 including a two-dimensional pattern code and posture detection patterns Fx and Fy having a rectangular plane shape that are arranged on two adjacent sides of the AR marker 2 on the same plane as that of the AR marker 2, in parallel, respectively.

The posture detection patterns Fx and Fy have a pattern (FDP: Flip Detection Pattern) that allows, even when the planar visual marker 1 is seen at a shallow angle, the posture inversion of the planar visual marker 1 to be detected based on the visual aspect (i.e., appearance). The posture detection pattern Fx detects the posture inversion at around the X axis shown in FIG. 3. The posture detection pattern Fy detects the posture inversion at around the Y axis shown in FIG. 3.

In order to realize this function, the posture detection patterns Fx and Fy are arranged, as shown in FIG. 3, so as to be orthogonal to each other on the same plane as that of the AR marker 2 at the periphery of the AR marker 2 (i.e., so as to be orthogonal to the X axis or the Y axis, respectively).

In FIG. 3, the posture detection pattern Fx may be arranged at the left side of the AR marker 2 (the second and third quadrants on the XY plane). The posture detection pattern Fy may be arranged at the lower side of the AR marker 2 (the third and fourth quadrants on the XY plane). Thus, the posture detection patterns Fx and Fy at the periphery of the AR marker 2 have the total of four types of layouts.

Figure 4:
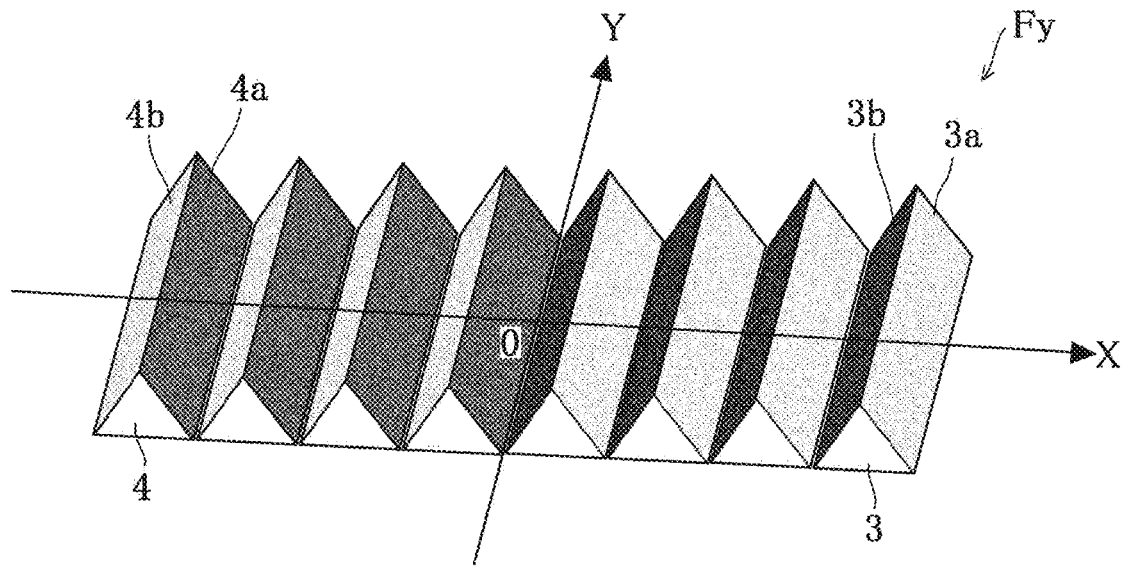
FIG. 4 is a perspective view illustrating the structure of a posture detection pattern Fy shown in FIG. 3.

FIG. 4 is a perspective view illustrating the structure of the posture detection pattern Fy shown in FIG. 3. The posture detection pattern Fx shown in FIG. 3 also has a structure similar to that of the posture detection pattern Fy shown in FIG. 4. Thus, the following description regarding the posture detection pattern Fy also can be applied to the posture detection pattern Fx.

As shown in FIG. 4, the posture detection pattern Fy has the corresponding side face positioned at the same plane (i.e., on the XY plane) and the center axis is composed of a plurality of triangle poles 3 and 4 all parallelly provided in the X axis direction so as to be parallel to the Y axis.

The posture detection pattern Fy shown in FIG. 4 has a structure in which the total of 8 triangle poles 3 and 4 are parallelly provided. However, the number of parallelly-provided triangle poles 3 and 4 is not limited to 8 and also may be any number equal to or higher than one.

The respective triangle poles 3 and 4 are configured so that two adjacent side faces of three side faces that are not on the XY plane are painted with different colors that can be easily distinguished even on the captured image.

For example, as shown in FIG. 4, the side faces 3a of the triangle poles 3 parallelly provided on the first and fourth quadrants are painted with white and the side faces 3b are painted with black. The side faces 4a of the triangle poles 4 parallelly provided on the second and third quadrants are painted with black and the side faces 4b are painted with white. Thus, the posture detection pattern Fy is configured so that, in the X axis direction orthogonal to the Y axis used as a reference in the decision of the posture inversion, an alternate painting is provided in which the triangle pole 3 has side faces painted with black and white in this order in the positive direction from the origin 0 and the triangle pole 4 has side faces painted with black and white in this order in the negative direction from the origin 0.

The black and white colors used in the above configurations may be other colors so long as the colors can be easily distinguished in a captured image as described above. For example, black and white may be exchanged in the above configuration.

In the above configuration, a series of side faces painted with the same color also may be provided so that not a specific color is painted but a design (pattern) such as a letter or a graphic pattern is drawn on the entirety of these side faces. Specifically, as shown in FIG. 5(b) for example, the letter "A" is drawn on the entirety of a series of side faces 3a painted with white described above. As shown in FIG. 5(c), the letter "B" is drawn on the entirety of a series of side faces 3b painted with black described above. The use of the pattern as described above also can be applied to posture detection patterns Fy and F (which will be described later) shown in FIG. 9 and FIG. 10.

The adjacent side faces of the triangle poles 3 and 4 painted with different colors as described above allow lights having different colors to be reflected from the side faces. However, lights having different colors also may be emitted from the side faces themselves. The posture detection pattern Fy also may be configured by a cylinder (e.g., circular cylinder, semicylinder) instead of the triangle poles 3 and 4.

FIG. 6 is a cross-sectional view illustrating the cross-sectional structure obtained when a plurality of parallelly-provided triangle poles 3 shown in FIG. 4 are cut along the X axis. As shown in FIG. 6, each triangle pole 3 is configured so that the side face 3b having a lower value X among two side faces 3a and 3b sandwiching a vertical angle VA is painted with black and the side face 3a having a higher value X is painted with white.

When the heights h of these triangle poles 3 are changed, the thickness of the posture detection pattern Fy and the roughness of the visual aspect also change but no substantial change is caused in the relation between the visual-line angle and the gray level variation of the color. When the vertical angle VA is changed on the other hand, then white and black density contrasts change in the vicinity of the visual-line angle close to 0 degree. A smaller vertical angle VA allows a stronger contrast to be seen within a range starting from the visual-line angle having a smaller absolute value.

FIG. 7A and FIG. 7B illustrate the function of the posture detection pattern Fy shown in FIG. 3 and FIG. 4. FIG. 7A is a schematic view illustrating how the posture detection pattern Fy is seen at a visual-line angle having a positive direction. FIG. 7B is a schematic view illustrating how the posture detection pattern Fy is seen at a visual-line angle having a negative direction. The posture detection pattern Fy has a function to reflect lights having colors different from each other to two spaces (ie. a space having a positive value X and a space having a negative value X) obtained by being divided by a plane including the Z axis forming the perpendicular line to the XY plane and the Y axis. This function will be described in detail in the following section.

The two adjacent side faces 3a, 3b, 4a, and 4b of the triangle poles 3 and 4 are alternately painted with white and black as described above, thus providing an appearance consisting of a thin stripe pattern of white and black. However, the ratio between the thicknesses of the respective white or black stripes changes depending on the visual-line angle. Thus, when the posture detection pattern Fy is seen from a space having a positive value X (i.e., in a direction along which the visual-line angle is positive), more black is seen in the side face 4a of the triangle pole 4 while more white is seen in the side face 3a of the triangle pole 3 as shown in FIG. 7A.

When the posture detection pattern Fy is seen from a space having a negative value X (i.e., in a direction along which the visual-line angle is negative) on the other hand, more white is seen in the side face 4b of the triangle pole 4 while more black is seen in the side face 3b of the triangle pole 3 as shown in FIG. 7B. Thus, when FIG. 7A is compared with FIG. 7B and when the posture detection pattern Fy is seen in a direction along which the visual-line angle is positive and when the posture detection pattern Fy is seen in a direction along which the visual-line angle is negative, a region seen as black and a region seen as white have an inverted positional relation in the X axis direction.

Figure 5:
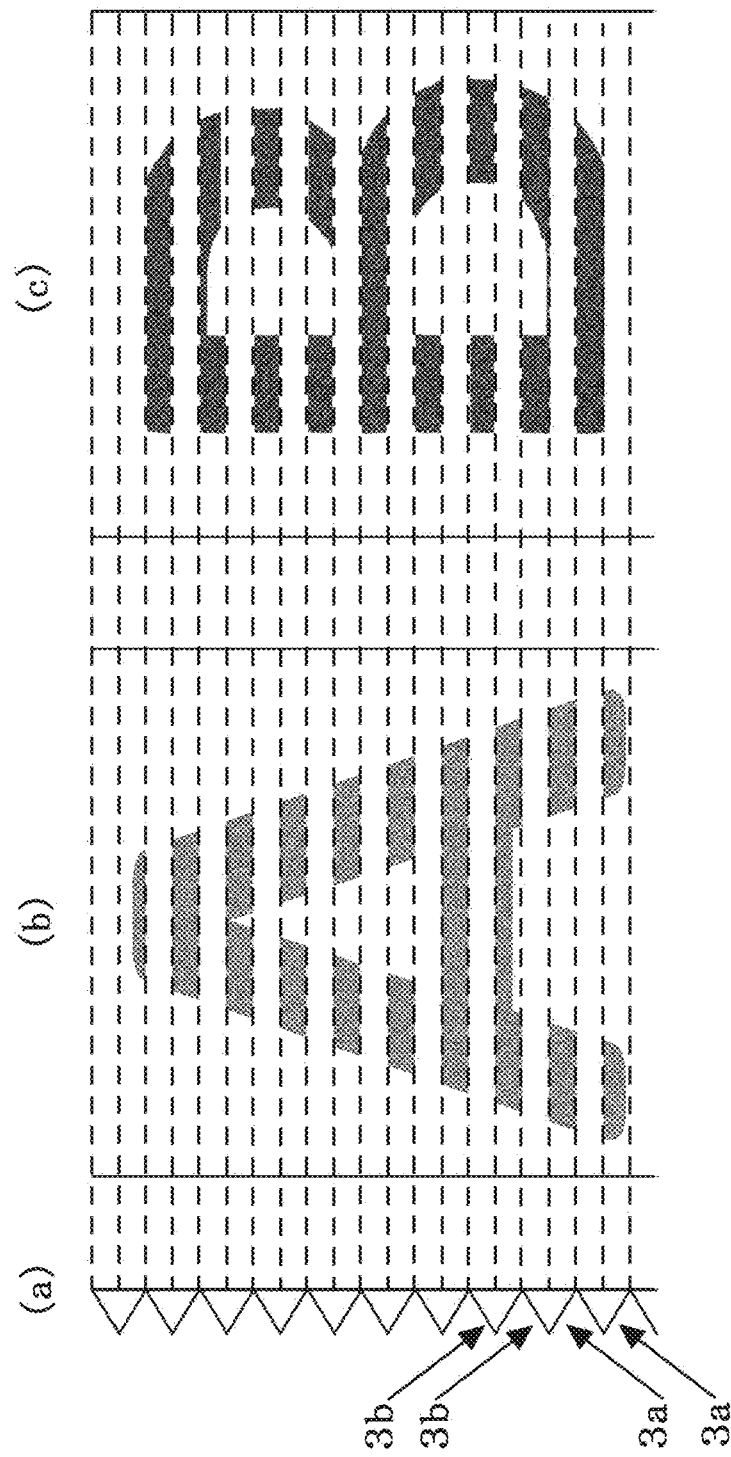
FIG. 5 illustrates another structure of the posture detection pattern Fy shown in FIG. 4.

As shown in FIG. 5, when a pattern is drawn on the side face, depending on the direction of the rotation around the rotation axis having the posture detection pattern Fy, the design drawn on the side face 3a and the pattern drawn on the side face 3b are seen as being switched. Thus, the pattern change in the visual appearance can be recognized as an image to thereby discriminate the direction of the inclination of the posture detection pattern Fy.

Figure 8:
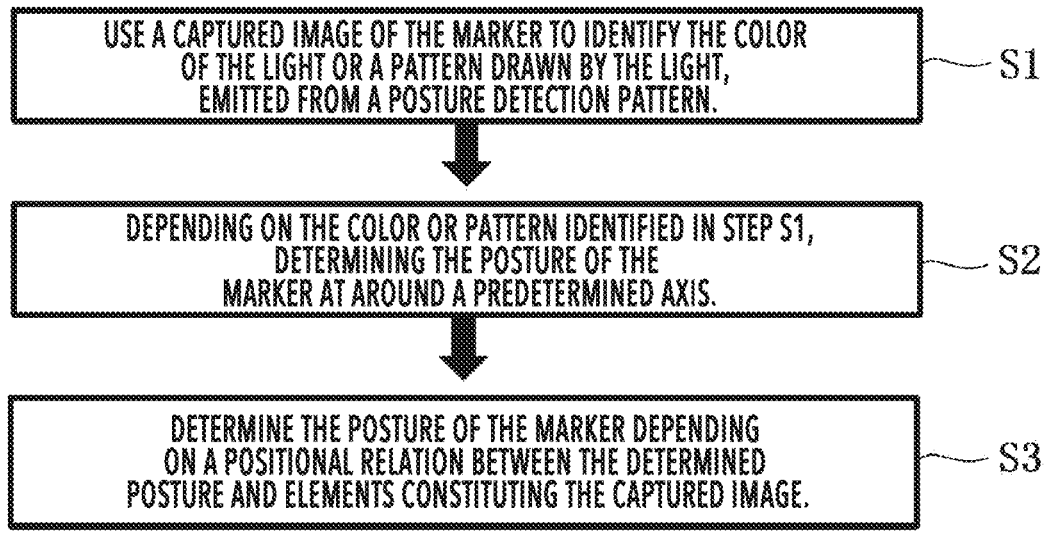
FIG. 8 is a flowchart illustrating the posture estimating method using the planar visual marker 1 shown in FIG. 3.

FIG. 8 is a flowchart illustrating the posture estimating method using the planer visual marker 1 according to Embodiment 1 of the present invention. The following section will describe the posture estimating method using FIG. 8.

First, in Step S1, a captured image of the planar visual marker 1 is used to identify the colors of the lights emitted from the two posture detection patterns Fx and Fy, respectively. Specifically, whether or not a region seen as black and a region seen as white of the posture detection pattern Fy for example have any of the positional relations of FIG. 7A and FIG. 7B is identified.

Next, in Step S2, depending on the color identified in Step S1, the posture around the predetermined axis of the planar visual marker 1 is determined. Specifically, the conventionally-used AR marker 2 for example is used to estimate the posture of the planar visual marker 1 in advance. Then, the determination is made, based on the estimated posture, with regard to whether an expected color and the color identified in Step S1 are the same or not.

When these two colors are not the same, it is determined that the actual posture of the planar visual marker 1 around the X axis of the posture detection pattern Fx and the actual posture of the planar visual marker 1 around the axis Y of the posture detection pattern Fy have an inverted relation relative to the earlier-estimated posture described above. If the two colors are the same, it is determined that the actual posture of the planar visual marker 1 around the X axis or the Y axis has the normal rotation relation relative to the earlier-estimated posture.

Next, in Step S3, the posture of the planar visual marker 1 is determined depending on the positional relation between the posture determined in Step S2 and elements constituting the captured image. Specifically, when the postures around the X axis and the Y axis determined in Step S2 for example have the normal rotation relation, as estimated earlier, the actual posture of the planar visual marker 1 is finally determined depending on the positional relation of the elements of the AR marker 2 constituting the captured image of the planar visual marker 1. When it is determined in Step S2 that the posture around the X axis or the Y axis has the inverted relation on the other hand, the earlier-estimated posture is converted, regarding the posture around the axis, based on an inversion model. Then, the resultant converted posture is finally determined as the actual posture around the axis of the planar visual marker 1.

The conversion using the inversion model can be realized by the well-known methods such as a method disclosed in International Publication WO/2015/045834 for example.

Figure 9:
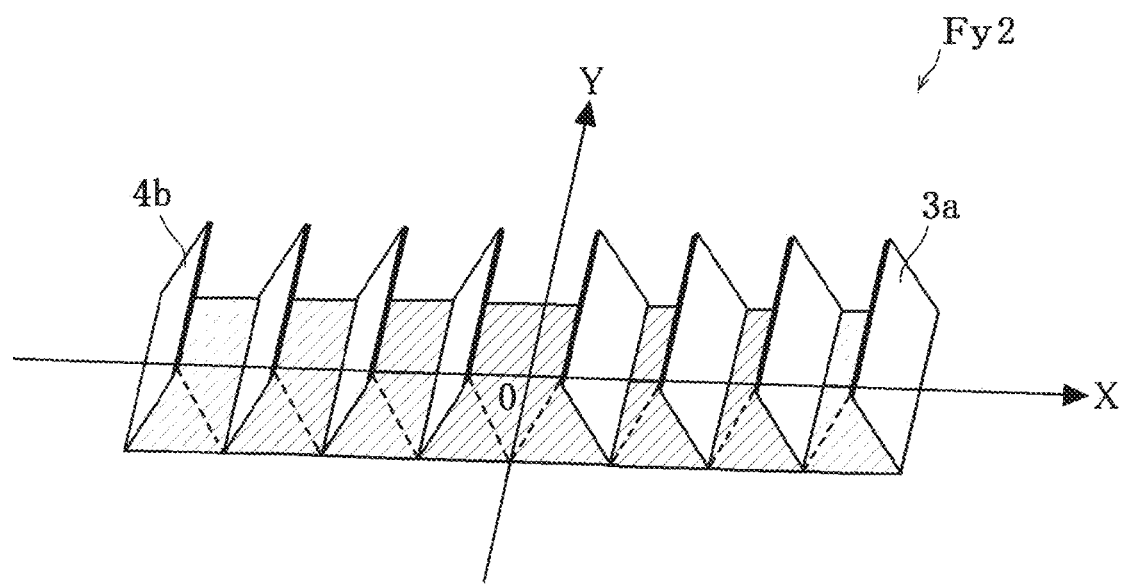
FIG. 9 is a perspective view illustrating another example of the structure of the posture detection pattern Fy shown in FIG. 4.

FIG. 9 is a perspective view illustrating another example of the structure of the posture detection pattern Fy shown in FIG. 4. The example shown in FIG. 9 also can be applied to the structure of the posture detection pattern Fx.

As shown in FIG. 9, the posture detection pattern Fy2 has a structure in which only the side faces 3a and 4b painted with white of the triangle poles 3 and 4 shown in FIG. 4 are left that constitute the posture detection pattern Fy. The back faces of these side faces 3a and 4b and the side faces of the triangle poles 3 and 4 positioned on the XY plane are both painted with black.

The structure shown in FIG. 9 is realized by inserting the side faces 3a and 4b has a plate-like shape to a plurality of guides (not shown) provided on the XY plane that are parallel to the Y axis for example.

The posture detection pattern Fy2 having the structure as described above has a white-and-black pattern depending on the observation direction (visual-line angle), thus providing a function similar to that of the posture detection pattern Fy.

By the way, as described above, the posture detection patterns Fx, Fy, and Fy2 all have a function to detect the posture inversion around one axis such as the X axis or the Y axis. A plurality of posture detection patterns having such a function also may be formed in an integrated manner on the same plane. The following section will exemplarily describe the posture detection pattern F by which the posture inversions around two orthogonal axes can be simultaneously detected by one pattern.

Figure 10:
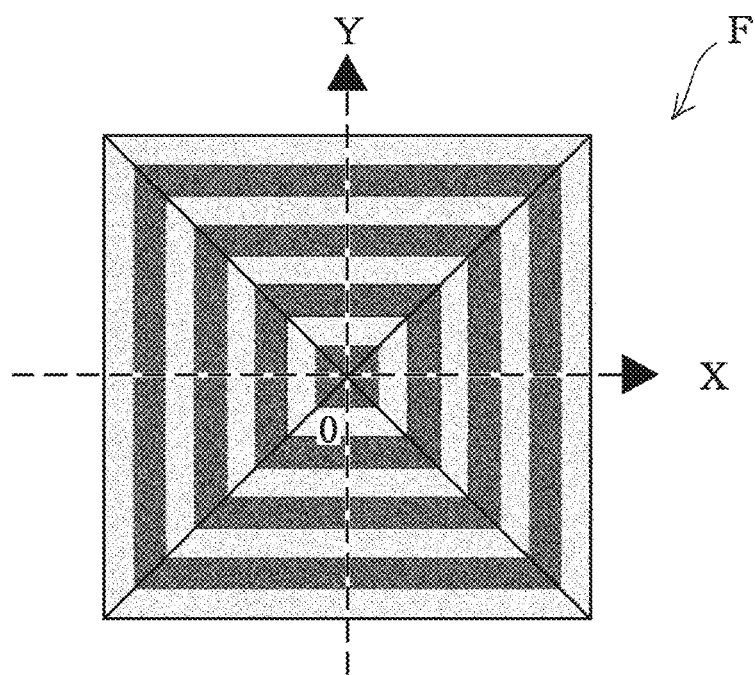
FIG. 10 is a plan view illustrating the configuration of the posture detection pattern F by which the posture inversion at around two axes orthogonal to each other.

FIG. 10 is a plan view illustrating the configuration of the posture detection pattern F. In FIG. 10, black parts correspond to the black side faces 3b and 4a shown in FIG. 4 while white parts correspond to the white side faces 3a and 4b shown in FIG. 4, respectively.

As shown in FIG. 10, the posture detection pattern F is obtained by combining a pattern in which stripe patterns parallel to the X axis are formed to detect the posture inversion around the X axis and a pattern in which stripe patterns parallel to the Y axis are formed to detect the posture inversion around the Y axis.

The posture detection pattern F having the configuration as described above as a function to simultaneously detect the posture inversion around the X axis and the Y axis orthogonal to each other. Thus, the planar visual marker 1 shown in FIG. 3 also may be configured so that the two posture detection patterns Fx and Fy are substituted with one posture detection pattern F.

Figure 11A:
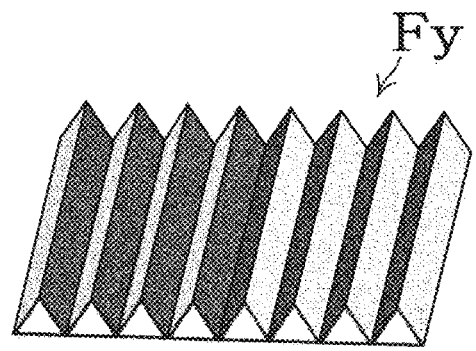
FIG. 11A is the first diagram illustrating an example of a method of preparing the posture detection pattern F shown in FIG. 10 and is a perspective view illustrating the structure of the posture detection pattern Fy.
Figure 11B:
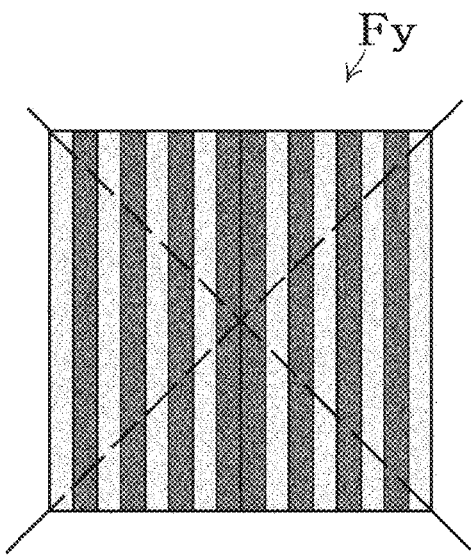
FIG. 11B is the second diagram illustrating the method of preparing the posture detection pattern F shown in FIG. 10 and is a plan view illustrating the posture detection pattern Fy shown in FIG. 11A seen from above.
Figure 11C:
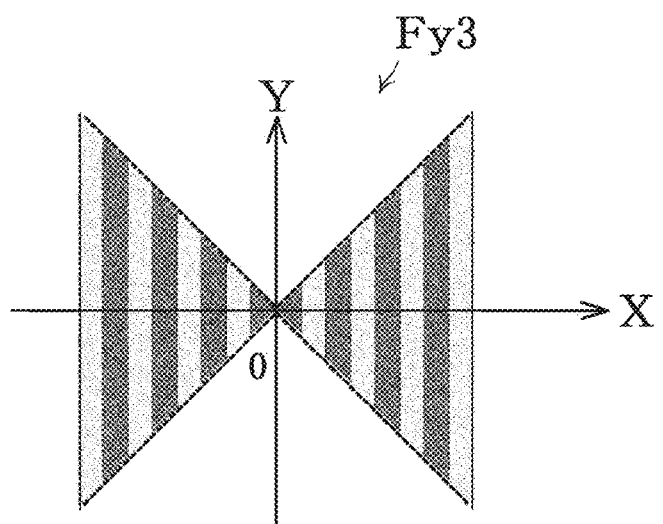
FIG. 11C is the third diagram illustrating the method of preparing the posture detection pattern F shown in FIG. 10 and is a plan view illustrating the configuration of the posture detection pattern Fy3 obtained when the posture detection pattern Fy shown in FIG. 11B is cut along two broken lines crossing each other.

FIG. 11A to FIG. 11C illustrate an example of a method of preparing the posture detection pattern F shown in FIG. 10. FIG. 11A is a perspective view illustrating the structure of the posture detection pattern Fy. FIG. 11B is a plan view illustrating the posture detection pattern Fy shown in FIG. 11A seen from above. FIG. 11C is a plan view illustrating the configuration of the posture detection pattern Fy3 obtained by cutting the posture detection pattern Fy shown in FIG. 11B along two broken lines crossing each other. As in FIG. 10, the black parts of FIG. 11B and FIG. 11C correspond to the black side face of the posture detection pattern Fy shown in FIG. 11A while the white parts correspond to the white side face of the posture detection pattern Fy, respectively.

The posture detection pattern Fy shown in FIG. 11B has an entirely-square plane shape. The posture detection pattern Fy3 shown in FIG. 11C is obtained by cutting the posture detection pattern Fy along two diagonal lines of this square. The posture detection pattern Fy obtained by the method as described above is rotated by 90 degrees around the origin of FIG. 11C as a center to combine the rotated pattern with another posture detection pattern Fy provided at a position prior to the rotation to thereby prepare the posture detection pattern F shown in FIG. 10.

As described above, the planar visual marker 1 according to Embodiment 1 of the present invention and the posture estimating method using the planar visual marker 1 allow the posture detection patterns Fx, Fy, and F to have a plane shape and to show a white-and-black pattern depending on the visual-line angle for example. Thus, even when the visual-line angle is large (i.e., even when the planar visual marker 1 is observed at a shallow angle), the posture of the planar visual marker 1 can be accurately detected while maintaining the flatness of the planar visual marker 1.

The planar visual marker 1 shown in FIG. 3 includes the two posture detection patterns Fx and Fy. However, when a target object B to which a planar visual marker is adhered has a limited posture for example and thus can have a free posture only around one axis, the posture of the target object B can be determined by such a planar visual marker that has a configuration similar to those of the posture detection patterns Fx, Fy, and Fy2 and that has one posture detection pattern to detect the posture around the one axis.

Embodiment 2

Figure 12:
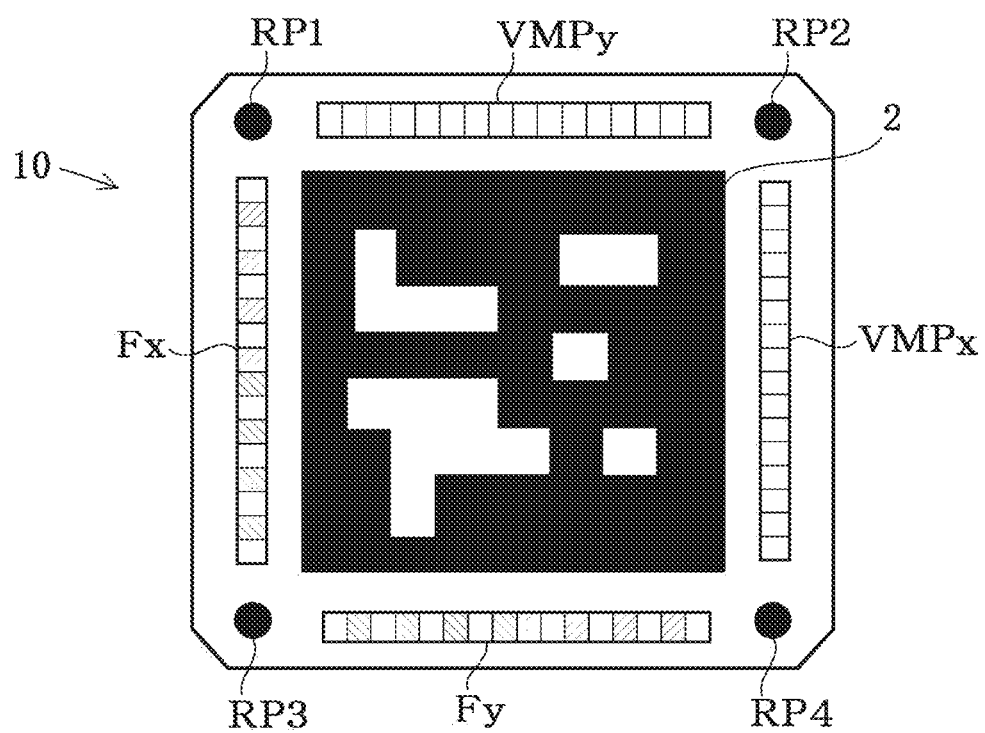
FIG. 12 is a plan view illustrating the configuration of the planar visual marker 10 according to Embodiment 2 of the present invention.
Figure 13A:
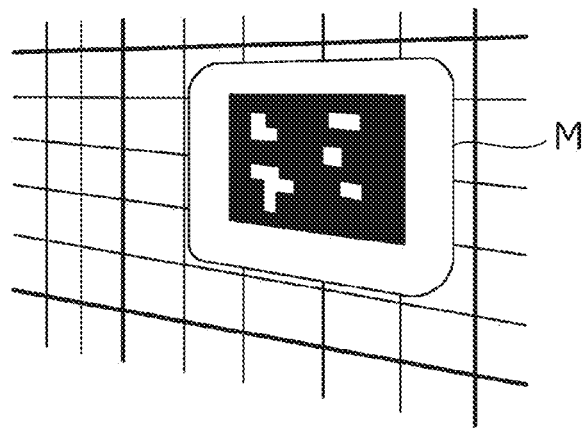
FIG. 13A is the first diagram illustrating the unclear posture of the planar visual marker and illustrating the perspective projection of the planar visual marker M onto an image.
Figure 13B:
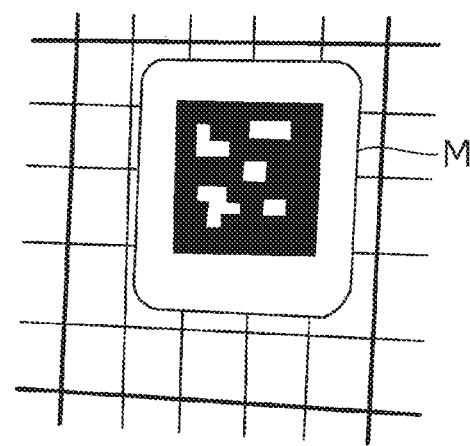
FIG. 13B is the first diagram illustrating the unclear posture of the planar visual marker and illustrates the orthogonal projection of the planer visual marker M onto an image.
Figure 14:
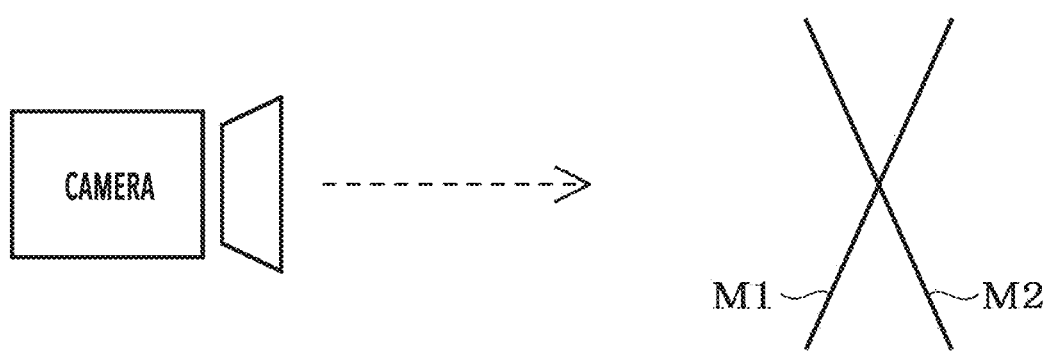
FIG. 14 is the second diagram illustrating the unclear posture of the planar visual marker.

FIG. 12 is a plan view illustrating the configuration of the planar visual marker 10 according to Embodiment 2 of the present invention. As shown in FIG. 12, the planar visual marker 10 includes the rectangular AR marker 2, reference points RP1 to RP4 provided at four corners of the planar visual marker 10 to correspond to the vertex of the AR marker 2, the posture detection patterns Fx and Fy parallelly provided to two adjacent sides of the AR marker 2, respectively, a variable moire pattern VMPx provided at a position opposed to the posture detection pattern Fx to sandwich the AR marker 2, and a variable moire pattern VMPy provided at a position opposed to the posture detection pattern Fy to sandwich the AR marker 2.

The variable moire patterns VMPx and VMPy are the well-known pattern disclosed in Japanese Patent Laid-Open No. 2012-145559 in which a lens provided on a drawn pattern is used to generate an interference fringe (pattern data) depending on the observation direction. For each divided range of the observation direction, the observation direction can be uniquely estimated depending on the position of the observed pattern data.

The variable moire patterns VMPx and VMPy are seen as a pattern in which black lines move in a one-dimensional manner depending on the visual-line angle. The variable moire patterns VMPx and VMPy also may be substituted with the well-known variable moire pattern seen as a pattern in which black dots move in a two-dimensional manner (see H. Tanaka, Y. Sumi, and Y. Matsumoto, "A high-accuracy visual marker based on a microlens array", in Proceedings of 2012 IEEE/RSJ International Conference of Intelligent Robots and Systems, pp. 4192-4197, 2012) for example.

The posture detection patterns Fx and Fy are not limited to the structure shown in FIG. 4 and may have the structure shown in FIG. 9. The two posture detection patterns Fx and Fy also may be substituted with the one posture detection pattern F shown in FIG. 10.

The use of the planar visual marker 10 having the configuration as described above also can, as in the case where the planar visual marker 1 shown in FIG. 3 is used, the posture estimating method shown in FIG. 8 to uniquely determine the posture of the planar visual marker 10.

The planar visual marker 10 according to Embodiment 2 of the present invention can use a variable moire pattern to determine the posture when a range of the visual-line angle is small for which the pattern generated by the posture detection pattern has a low contrast and can determine the posture using the posture detection pattern when the visual-line angle is not within such a range. Thus, the posture of the planar visual marker 10 can be uniquely determined in a more accurate manner in the entire visual-line angle range while maintaining the flatness of the planar visual marker 10.

REFERENCE SIGNS LIST 1, 10 Planar visual marker
2 AR marker
3, 4 Triangle pole
3a, 3b, 4a, 4b Side face
F, Fx, Fy, Fy2, Fy3 Posture detection pattern
VMPx, VMPy Moire pattern formation part
SA Visual-line angle

The invention claimed is:

1. A marker, comprising:
a two-dimensional pattern code;
a first posture detection pattern emitting different light depending on an observation direction of the two-dimensional pattern code at around the first axis on a two-dimensional plane formed by the two-dimensional pattern code; and
the first posture detection pattern emits mutually-different lights to two spaces obtained by being divided by a plane including a perpendicular line to the two-dimensional lane and the first axis.

2. The marker according to claim 1, further comprising:
a second posture detection pattern that emits, at around a second axis orthogonal to the first axis on the two-dimensional plane, different light depending on an observation direction of the two-dimensional pattern code, and
the second posture detection pattern emits mutually-different lights to two spaces obtained by being divided by a lane including a perpendicular line to the two-dimensional lane and the second axis.

3. The marker according to claim 2, wherein:
each of the first and second posture detection patterns is configured so that two adjacent side faces emitting the different lights have different colors or consist of at least one triangle pole having different patterns and a center axis of the triangle pole constituting the first posture detection pattern is provided to be parallel to the first axis and a center axis of the triangle pole constituting the second posture detection pattern is provided to be parallel to the second axis.

4. The marker according to claim 3, wherein:
each of the first and second posture detection patterns is positioned so that the corresponding side faces are positioned on the same plane and center axes consist of a plurality of the triangle poles parallelly provided to be parallel to one another.

5. The marker according to claim 2, wherein:
the two-dimensional pattern code has a rectangular shape; and
the first posture detection pattern is provided to be parallel to a first side constituting the rectangle and the second posture detection pattern is provided to be parallel to a second side which constituting the rectangle and adjacent to the first side.

6. The marker according to claim 2, wherein:
the first and second posture detection patterns are formed in an integrated manner on the same plane.

7. The marker according to claim 1, further comprising:
a variable moire pattern including a lens provided on a pattern to generate pattern data that depends on an observation direction and uniquely estimates, depending on each divided range in the observation direction, the observation direction depending on a position of the pattern data which is observed.

8. A posture estimating method using a marker according to claim 1, comprising:
a first step of using a captured image of the marker to identify a color of the light or a pattern drawn by the light;
a second step of determining, depending on the color or the pattern identified in the first step, a posture of the marker at around the first axis; and
a third step of determining a posture of the marker depending on a positional relation between the posture at around the first axis determined in the second step and the elements constituting the captured image.

9. The posture estimating method using the marker, according to claim 8, further comprising:
a second posture detection pattern that emits, at around a second axis orthogonal to the first axis on the two-dimensional plane, different light depending on an observation direction of the two-dimensional pattern code, and
the second posture detection pattern emits mutually-different lights to two spaces obtained by being divided by a plane including a perpendicular line to the two-dimensional plane and the second axis, wherein:
the first step identifies the light from the first and second posture detection patterns;
the second step determines a posture of the marker at around the first and second axes; and
the third step determines a posture of the marker depending on the posture at around the first and second axes determined in the second step.

10. A posture estimating method using a marker according to claim 2, comprising:
a first step of using a captured image of the marker to identify a color of the light or a pattern drawn by the light;
a second step of determining, depending on the color or the pattern identified in the first step, a posture of the marker at around the first axis; and
a third step of determining a posture of the marker depending on a positional relation between the posture at around the first axis determined in the second step and the elements constituting the captured image.

11. A posture estimating method using a marker according to claim 2, comprising:
a first step of using a captured image of the marker to identify a color of the light or a pattern drawn by the light;
a second step of determining, depending on the color or the pattern identified in the first step, a posture of the marker at around the first axis; and
a third step of determining a posture of the marker depending on a positional relation between the posture at around the first axis determined in the second step and the elements constituting the captured image.

12. A posture estimating method using a marker according to claim 3, comprising:
a first step of using a captured image of the marker to identify a color of the light or a pattern drawn by the light;
a second step of determining, depending on the color or the pattern identified in the first step, a posture of the marker at around the first axis; and
a third step of determining a posture of the marker depending on a positional relation between the posture at around the first axis determined in the second step and the elements constituting the captured image.

13. A posture estimating method using a marker according to claim 4, comprising:

a first step of using a captured image of the marker to identify a color of the light or a pattern drawn by the light;

a second step of determining, depending on the color or the pattern identified in the first step, a posture of the marker at around the first axis; and a third step of determining a posture of the marker depending on a positional relation between the posture at around the first axis determined in the second step and the elements constituting the captured image.

14. A posture estimating method using a marker according to claim 5, comprising:

a first step of using a captured image of the marker to identify a color of the light or a pattern drawn by the light;

a second step of determining, depending on the color or the pattern identified in the first step, a posture of the marker at around the first axis; and a third step of determining a posture of the marker depending on a positional relation between the posture at around the first axis determined in the second step and the elements constituting the captured image.

15. A posture estimating method using a marker according to claim 6, comprising:

a first step of using a captured image of the marker to identify a color of the light or a pattern drawn by the light;

a second step of determining, depending on the color or the pattern identified in the first step, a posture of the marker at around the first axis; and a third step of determining a posture of the marker depending on a positional relation between the posture at around the first axis determined in the second step and the elements constituting the captured image.

16. A posture estimating method using a marker according to claim 7, comprising:

a first step of using a captured image of the marker to identify a color of the light or a pattern drawn by the light;

a second step of determining, depending on the color or the pattern identified in the first step, a posture of the marker at around the first axis; and a third step of determining a posture of the marker depending on a positional relation between the posture at around the first axis determined in the second step and the elements constituting the captured image.

\* \* \* \* \*